United States Patent [19]

Aoyama

[11] 4,081,732
[45] Mar. 28, 1978

[54] AUTOMATIC POSITIONING METHOD AND APPARATUS

[75] Inventor: Tadamasa Aoyama, 4034-1 Kamariya-cho, Kanazawa, Yokohama, Kanagawa, Japan

[73] Assignee: Tadamasa Aoyama, Yokohama, Japan

[21] Appl. No.: 663,203

[22] Filed: Mar. 2, 1976

[51] Int. Cl.² .......................................... G05B 19/28
[52] U.S. Cl. .................................... 318/603; 318/601
[58] Field of Search ............... 318/601, 602, 603, 571, 318/574, 575, 568; 235/151.11

[56] References Cited

U.S. PATENT DOCUMENTS

| | | | |
|---|---|---|---|
| 3,013,195 | 12/1961 | Langham | 318/578 X |
| 3,512,060 | 5/1970 | Floyd | 318/603 UX |
| 3,599,068 | 8/1971 | Kanamori | 318/600 |
| 3,774,097 | 11/1973 | Roy | 318/568 X |
| 3,886,424 | 5/1975 | Hoshina et al. | 318/604 X |
| 3,906,324 | 9/1975 | Smith | 318/603 X |
| 3,922,671 | 11/1975 | Tripp | 318/603 X |
| 3,944,799 | 3/1976 | Brownell | 318/603 X |
| 3,962,620 | 6/1976 | Dion | 318/601 X |

Primary Examiner—B. Dobeck
Attorney, Agent, or Firm—Burns, Doane, Swecker & Mathis

[57] ABSTRACT

The invention relates to an automatic positioning apparatus which is primarily adapted to control the position of a movable part of a machine tool such as a tool rest of a lathe in response to an output signal of a means for measuring the distance of travel of the movable part, and the output signal of a setting circuit on which parameters of motion of the movable part may be preset.

9 Claims, 1 Drawing Figure

AUTOMATIC POSITIONING METHOD AND APPARATUS

BACKGROUND OF THE INVENTION

In recent years, numerical control of machine tools has made remarkable progress, and made possible various improvements in machine tools such as automation thereof, improvement in productivity, reduction in machine cost and so forth.

In comparison with conventional universal machine tools in general however, machine tools which may be provided with numerical control are typically extremely costly. In addition, universal machine tools have retained a predominance in this field of art. For these reasons, attempts have been made to automate universal machine tools in use by modifying them to provide them with numerical control. Yet these attempts have mostly failed to provide a really satisfactory result. The principal difficulty with the conventional method has been the object positioning system. This is a serious problem because said positioning system of the object is of utmost importance for performing the numerical control satisfactorily.

In other words, a typical system of positioning for numerical control employs a pulse motor as a driving source of the object to be controlled whereby a distance of movement of the object to be controlled is converted to an angle of revolution of the pulse motor so that positioning of the object may be controlled by means of an instruction code punched on a tape related to quantity, speed, direction, etc. of revolution of the pulse motor.

The above-described positioning system likewise calls essentially for high precision feed screws as well as bearing means in order to accurately transmit the quantity and speed of revolution of the pulse motor to the object to be controlled. Needless to say, these component parts are extremely expensive. Further, to reduce aging of a sliding part of the machine tool and enhance rigidness thereof, quenching or similar processing must be performed to assure high rigidity in the sliding part, resulting in further increase in the cost of production.

Moreover, programming of the tape for the control of the pulse motor requires essentially much skill and a long period of time. Taken together with the above-mentioned problems, this further increases the cost of production.

When universal machine tools are modified to employ a positioning system including a pulse motor so that numerical control may be utilized, various parts of the machine tools, e.g., driving section, must be modified. The cost benefit of the numerical control oftentimes does not balance with the cost of modification. This imposes one of the major obstacles to the wide use of numerical control in the field of the machine tools.

The primary object of the present invention is, therefore, directed to provide an automatic positioning apparatus for use in the numerical control of machine tools and other machines which makes it possible to effect positioning of the moving part of the machines with high accuracy.

It is another object of the present invention to provide an automatic positioning apparatus for use in the numerical control of universal machine tools which are already in use, without substantial modification thereof, said apparatus being capable of insuring highly accurate positioning of the moving part.

Still another object of the present invention is to inexpensively provide the above-described automatic positioning apparatus.

These and other objects and features of the invention will become apparent from the claims and from the following description when read in conjunction with the appended drawings.

DETAILED DESCRIPTION

Figure 1:
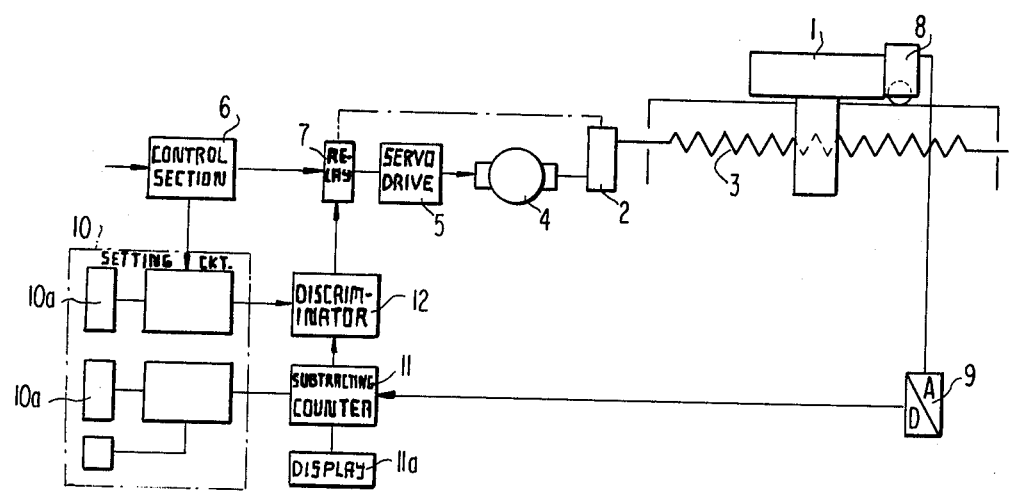
FIG. 1 is a block diagram illustrating an embodiment of the present invention.

The present invention contemplates the accomplishment of the above-described objects by means of the automatic positioning apparatus to be adapted directly to a moving part of a machine for effecting positioning by way of a numerical control. Namely, the present apparatus is adapted, for example, to a table of a machine tool which is actuated for movement by proper driving means such as a DC servo motor.

The present apparatus comprises a measuring machine of a mechanical construction which can produce output signal of one pulse per proper unit of distance of movement of said moving part; a setting circuit which presets set values by a multiple digital switch or any programmable means, each of said set values indicating a deceleration position, a stop position and the like on the basis of a scheduled quantity of movement or an actual quantity of movement of the moving part; a subtracting counter which receives the signal output from said measuring machine as well as from the setting circuit, and displays each set value and deducted value obtained by deducting a measured value from each set value; and a discriminating circuit for producing an actuation signal to an output relay circuit which connects or disconnects a control signal to be applied to the driving source when an operated value of the subtracting counter becomes equal to a set value of the multiple digital switch or a set value of any program of the setting circuit, or when both said values become zero simultaneously.

Referring now to the block diagram, a moving part 1 of a machine such as a table of a machine tool is shown. The part 1 is engaged for movement by means of a DC servo motor 4 for driving a power transmission mechanism which may include mechanism 2 such as a reduction gear, a clutch, a brake or the like, and a feed screw 3 which is connected with the mechanism 2.

The servo motor 4 is connected to a control section 6 including a suitable conventional servo drive circuit 5 via an output relay circuit 7 so that when the output relay circuit 7 is made conductive or non-conductive selectively, a control signal from the servo drive circuit 5 is applied to the servo motor 4 to thereby control the speed of the motor and actuate the clutch, brake and the like.

A measuring machine 8 is constructed purely mechanically on the principle of a measuring machine for a map, and can produce an analog signal corresponding to distances of travel accurate to 0.01 mm. This type of a measuring machine is available on the market in the U.S. or other countries. Such device is manufactured by Southwestern Industries, Inc. 5880 Centinela Avenue, Los Angeles, Calif., and is identified by the name "Trak Sensor." In one embodiment, said measuring means may be a member, rotatably mounted on the movable part and engaging a stationary portion of the machine tool, which measuring means produces an analog signal related in value to the motion of said member induced by the movement of the movable part relative to the stationary portion of the machine tool. Said analog signal may also be related in value to the distance of travel of the movable part with respect to the stationary portion of the tool machine.

A suitable, conventional analog-digital converter 9 converts a measured value (analog) of the measuring machine 8 into a pulse signal (digital) of one pulse per 0.01 mm. Usually, the converter 9 incorporates a device which utilizes the principle of an encoder which may be incorporated in measuring machine 8.

By means of a conventional multiple digital switch 10a, a setting circuit 10 presets instruction values which indicate a scheduled quantity of movement of the aforementioned moving part 1 or a deceleration position thereof determined on the scheduled quantity of movement. The set values preset in this circuit 10 are converted into pulses, counted and thereafter displayed in a conventional manner on a display 11a of a subtracting counter 11 to be described in the following paragraph.

As mentioned above, one of the functions of the conventional subtracting counter 11 is to receive a value indicating a scheduled quantity of movement of the moving part 1 which is preset by the setting circuit, and to display this value on the display 11a. The subtracting counter 11 also receives a pulse signal from the measuring machine 8 when the moving part 1 causes its movement. The subtracting counter 11 deducts the measuring machine input value (subtrahend) from the above-mentioned value (minuend) indicating a scheduled quantity of movement. The operated value (i.e. the balance of the value indicating the schedule quantity of movement) is then displayed on the display 11a, and also communicated to a subsequent circuit.

The reference numeral 12 denotes a suitable, conventional discriminating circuit. This circuit 12 receives an output signal of the subtracting counter 11 and the set value which is produced by the setting circuit 10, compares the former with the latter, and produces an output signal for actuating the output relay circuit 7 in order to allow the servo drive circuit 5 to apply a deceleration signal to the servo motor 4 when, as for example, the operated value illustrated on the display 11a of the subtracting counter 11 corresponds to the value which is preset to indicate a deceleration position by the multiple digital switch 10a of the setting circuit 10.

When the display 10a of the subtracting counter 11 indicates zero, and at the same time, when the multiple digital switch 10a of the setting circuit 10 is set at zero or a few switch position stops before zero, the above-mentioned discriminating circuit 12 renders the output relay circuit 7 conductive so that the servo drive circuit 5 inputs a signal for stopping the DC motor 4 thereat.

In practice, when the apparatus of the present invention is used in conjunction with a conventional machine tool, the measuring device 8 is first fitted directly to the moving part of the machine tool of which moving quantity is to be controlled, e.g., the table of the machine tool, and the discriminating circuit 12 is then connected to the output relay circuit 7 of the DC servo motor 4 as the driving means of the moving part 1. In this instance, basically no modification is required at all for the main body of the machine tool such as of the sliding part thereof.

Subsequently, the starting point is determined properly for the moving part 1 of the machine tool, and the power supply of the present apparatus is turned on. A scheduled quantity of movement of the moving part 1 is preset by manipulating the multiple digital switch 10a of the setting circuit 10, and a deceleration position is preset on the basis of this value in the same manner as above whereby the scheduled quantity of movement is illustrated on the display 11a of the subtracting counter 11 in terms of a numerical value.

Desired operating parameters (such as a normal feed speed, a deceleration speed, etc.) of the DC servo motor 4 ae set in the control section 6 in proportion to each set value of the setting circuit 10.

After confirming that there is no error in programming in the above-mentioned setting circuit 10, the starting switch is turned on, whereby a start-instruction of the motor 4 is communicated to the motor 4 to initiate movement of the moving part 1, and upon movement thereof, the measuring machine 8 producing travelling counts which are sequential, sequentially, pulse signals indicating a moving distance of the moving part 1 at each instant to the subtracting counter 11 as its input. Since the subtracting counter 11 has already been input by the numerical values indicating the scheduled quantity of movement from the setting circuit 10, however, the subtracting counter 11 operates to sequentially deduct these values by the above-mentioned values of pulse signals that are sequentially input thereto along with movement of the moving part, whereby the difference values obtained by the deducting operation are sequentially displayed on the display 11a.

The balance value of the subtracting counter 11 is subsequently applied to the discriminating circuit 12, and compared with the value indicating a deceleration position that has been preset in the setting circuit 10. When both the values become equal to each other in the discriminating circuit 12, this circuit 12 produces a signal causing output relay circuit 7 to become conductive to pick up a deceleration signal from the control section 6, and in consequence, the DC servo motor 4 is operated by the deceleration signal from the servo drive circuit 5. Accordingly, the moving part 1 is decelerated to a predetermined speed at a position where it is scheduled to be decelerated, and thereafter resumes its movement at the speed.

When the moving part 1 is decelerated, and continues moving, the balance value in the subtracting counter 11 gradually approaches to, and finally reaches, zero, and the multiple digital switch 10a also returns to zero. Thus, the discriminating circuit 12 renders the output relay circuit 7 conductive to turn off the power supply of the DC servo motor 4 whereby the clutch and the brake are actuated to stop the moving part 1 at the position of the scheduled quantity of movement.

It is possible that the moving part 1 may not stop moving for one reason or another (e.g., for some mechanical reason) notwithstanding the fact that both the values of the subtracting counter 11 and the multiple digital switch 10 of the setting circuit 10 are zero thereby placing the DC servo motor in the "OFF" state, and communicate an "ON" signal to the brake and clutch. If the moving part 1 still does not stop and continues moving in this instance, count pulses from the measuring machine 8 are additively illustrated on the display 11a of the subtracting counter 11.

The above-mentioned overrun of the moving part 1 can be avoided in the following manner. A detector may be connected to receive an output signal from either the display 11a or the subtracting counter 11 so that the detector detects an input of count pulses after the display 11a effects zero-indication. The detector is associated with a mechanism which, upon actuation of the detector, imposes an emergency stop on the moving part 1.

As hereinabove noted, in accordance with the present invention, there is provided an automatic positioning apparatus which comprises a measuring machine of a mechanical construction which is adapted directly to a moving part of a machine such as a table of a machine tool, measures a quantity of movement of the moving part, and produces a digital output signal corresponding to movement of the part; a setting circuit which may be preset to a predetermined value of a scheduled quantity of movement of the moving part or of a deceleration position thereof by means of a multiple digital switch; a subtracting counter which receives the set values of the setting circuit to indicate the same on a display, receives the output signal of the measuring device to indicate a continuous measure of the distance through which the part has traveled, deducts the current numerical value from the set value to indicate the balance on the display, and transmits a signal corresponding to the balance to a subsequent circuit; and a discriminating circuit for producing an actuation signal applied to an output relay circuit which, by comparing the set value from the setting circuit with the output value from the subtracting counter, connects or disconnects a control signal for a DC servo motor as driving means for the moving part only when the above-mentioned two values are equal to each other.

Because of the above-mentioned construction, the apparatus of the present invention eliminates the problem of a high-production cost observed usually in the conventional positioning system employing a pulse motor as a driving source. Moreover, in accordance with the present invention, machine tools can be automated irrespective of the type of a driving source thereof, and presetting of set values can be effected easily on the spot of work by means of a multiple digital switch with reference to a drawing. As can be appreciated from the foregoing description, the present apparatus is easy to handle and operate, and very advantageous as an automatic positioning apparatus for positioning of a moving part of a machine to be controlled, thus attaining the objects hereinfirst noted.

The principles, preferred embodiments, and modes of operation of the present invention have been described in the foregoing specification. The invention which is intended to be protected is not, however, to be construed as limited to the particular forms disclosed, since these are to be regarded as illustrative rather than restrictive. Variations and changes may be made by those skilled in the art without departing from the spirit and scope of the present invention.

What is claimed is:

1. In a machine tool apparatus having a stationary portion, a movable part and means including a motor for positioning the movable part along a predetermined path of travel with respect to the stationary portion of said apparatus; the improvement wherein the positioning means includes:
  a. a setting circuit including a multiple switch for providing a first signal related in value to a predetermined distance of travel of the movable part from the starting position;
  b. distance measuring means for providing a second signal related in value to the distance through which the movable part travels with respect to a starting position on the stationary portion of the apparatus; wherein said distance measuring means includes a member rotatably mounted on the movable part and frictionally engaging the stationary portion of the apparatus for generating an analog signal in response to movement of the member induced by the relative movement of the movable part with respect to the stationary portion of the apparatus;
  c. subtracting means responsive to the first and second signals for providing an output signal related in value to the value of the second signal reduced by the value of the first signal; and,
  d. a discriminating circuit responsive to the attainment of a predetermined value by said output signal for providing a control signal to control the positioning of the movable part.

2. The improvement of claim 1 wherein said control signal is applied to said motor to control the speed of movement of the movable part.

3. The improvement of claim 1 wherein said control signal is operative to stop the movement of the movable part.

4. The improvement of claim 1 wherein said distance measuring means includes means for converting said analog signal into a pulsed signal wherein each pulse of said signal corresponds to a unit of distance through which the movable part travels.

5. The improvement of claim 4 wherein said subtracting means includes means for converting the first output signal of said setting circuit to an equivalent digital signal for counting the pulses produced by said distance measuring means and for subtracting said pulses from the digital equivalent of said first output signal.

6. The apparatus of claim 1 further comprising means for displaying the distance to which the second signal is related in value.

7. The apparatus of claim 1 further comprising means for displaying the distance to which the output signal of said subtracting means is related in value.

8. A machine tool apparatus comprising:
  a base member;
  a part adapted to engage a work piece to be machined; and means for positioning said work piece engaging part with respect to said base member comprising:
    a drive train including a motor for driving said part to motion with respect to said base member;
    means attached to one of said base member and said part and in movable contact with the other of said base member, and said part for directly measuring relative motion between said part and said base member and for providing a first signal related in value to the quantity of relative motion between said part and said base member;
    a setting circuit for providing a second signal related in value to a predetermined quantity of relative motion between said part and said base member;
    means responsive to the first and second signals for providing an output signal related in value to the value of the second signal reduced by the value of the first signal; and
    a discriminating circuit responsive to the attainment of a predetermined value of said output signal for providing a control signal to said drive train to control the positioning of said part.

9. A method for controlling a machine tool, wherein the machine tool includes a stationary portion, a movable part and a drive train, including a motor, for positioning the movable part along a predetermined path of travel with respect to the stationary portion of the tool, and wherein the machine tool is retrofitted for numeric control responsive to measuring the actual motion of the movable part without measurement of rotary motion of the drive train motor, comprising the steps of:

disposing an electromechanical encoder on one of said stationary portion and said movable part so that the encoder travels with the one of said stationary portion and said movable part and movably contacts the other of said stationary portion and said movable part, to provide a first signal related in value to the distance through which the movable part travels with respect to a starting position on the stationary portion of the apparatus; providing a second signal related in value to a preset distance of travel;

providing a third signal related in value to the difference between the first and second signals; and, controlling the drive train responsively to the attainment by the third signal of a predetermined value.

* * * * *